United States Patent [19]
Schmidt

[11] 3,840,052
[45] Oct. 8, 1974

[54] THREAD PROTECTOR

[75] Inventor: Adam M. Schmidt, Euclid, Ohio

[73] Assignee: The Weatherhead Company, Cleveland, Ohio

[22] Filed: Jan. 22, 1973

[21] Appl. No.: 325,567

Related U.S. Application Data

[63] Continuation of Ser. No. 127,538, March 24, 1971, abandoned.

[52] U.S. Cl. ............................................. 138/96 T
[51] Int. Cl. .......................................... B65d 59/08
[58] Field of Search .......... 138/96 R, 96 T, 89, 121, 138/104, 119; 220/42 A; 285/DIG. 2; 16/42 R, 42 T, 108, 109

[56] References Cited
UNITED STATES PATENTS

| | | | |
|---|---|---|---|
| 600,892 | 3/1898 | Schirra | 138/96 T |
| 1,783,893 | 12/1930 | Unke | 138/96 R |
| 2,551,834 | 5/1951 | Ferguson | 138/96 T |
| 2,632,479 | 3/1953 | Pfeil et al. | 138/96 T |
| 3,190,536 | 6/1965 | Schwartz | 138/96 R X |
| 3,310,623 | 3/1967 | Vaughan | 138/108 X |
| 3,487,574 | 1/1970 | Loof | 138/121 X |
| 3,496,800 | 2/1970 | Brezinski | 138/96 T UX |
| 3,606,073 | 9/1971 | Burke | 138/96 T X |

*Primary Examiner*—Charles A. Ruehl
*Attorney, Agent, or Firm*—McNenny, Farrington, Pearne & Gordon

[57] ABSTRACT

A thread protector for an externally threaded member such as a hydraulic or pipe fitting comprising a tubular article with a polygonal cross section having reentrant or concave sides which provide exceptional expansion characteristics. The cross-sectional configuration enables the article to expand onto a threaded member without excessive interference forces and provides gripping portions extending radially beyond a shoulder of the threaded member to facilitate its removal.

6 Claims, 7 Drawing Figures

PATENTED OCT 8 1974

3,840,052

INVENTOR.
ADAM M. SCHMIDT
BY
McNENNY, FARRINGTON, PEARNE & GORDON
ATTORNEYS

THREAD PROTECTOR

This is a continuation of application Ser. No. 127,538 filed Mar. 24, 1971, now abandoned.

BACKGROUND OF THE INVENTION

This invention pertains to sleeve-type thread protectors for protectively covering the mechanical threads of an exteriorly threaded member and is particularly adapted for use with threaded hydraulic or pipe fittings.

Relatively sharp edges of external threads of hydraulic or pipe fittings are particularly vulnerable to damage by nicking or crushing when the fittings are being handled after manufacture and during transit. It is a practice to temporarily protect fitting threads from such damage and from contamination by foreign material by covering them with a disposable material or a sleeve-type article during the time between manufacture and ultimate use.

In the prior art, the simplest type of protective device comprises a short length of cylindrical tubing of paper or plastic or other non-metallic material having an internal diameter about equal to the crest diameter of the threads to be protected. This cylindrical type sleeve is associated with difficulties of providing a satisfactory fit on a threaded member. Due to manufacturing tolerances and variations in either the fitting or sleeve, or both, often a sleeve of this type is either too small to be readily installed and removed or it is too large to be reliably retained on the threads.

Known variations of the cylindrical type sleeve thread protector are sleeves which are permanently deformed to provide a slight non-circular shape such as an oval or triangular shape. The sleeve may be formed by plastically deforming a cylindrical blank, having an internal diameter slightly greater than the nominal thread crest diameter, radially inward at spaced points about its circumference. Interior surface portions of the resulting deformed sleeve define an inscribed circle somewhat smaller in diameter than the nominal thread crest diameter and thereby provide interference with the threads. This type of sleeve makes dimensional variations in the elements less critical for a satisfactory fit than with a plain cylindrical sleeve. While affording some practical improvement in fit, normally a sleeve of this type is limited to use with a single thread size and style since its range of diameter variation or expansion is relatively limited.

SUMMARY OF THE INVENTION

The invention represents an improvement in tubular thread protecting sleeves and provides a sleeve having a tubular cross-sectional configuration which, for a given size, accommodates a wide range of thread sizes and styles. The tubular cross section is formed as a polygon having reentrant or concave sides. The cross-sectional configuration produces advantageous elastic expansion characteristics which facilitate installation and removal of the sleeve and insure a positive fit on widely varying thread diameters. The sleeve is expanded by moving or bending the mid-portion of each side of the polygonal cross section radially outward. Deflection of these concave sides reduces their degree or reentrance or concavity and thereby increases their effective length. This effective lengthening of each side expands the sleeve to fit a particular thread diameter. Since the sleeve is expanded by bending the cross-sectional sides rather than simply by elongating them in tension, large variations in size may be achieved without producing excessive expansion and gripping forces.

Another aspect of the invention is the provision of a cross-sectional configuration which permits the sleeve to be readily removed from a threaded fitting. Typically, when used with pipe or hydraulic fittings, thread protectors are abutted against a radial shoulder forming hexagonally arranged wrench flats. The cross-sectional configuration of the thread protector is provided with corners which extend radially beyond portions of the radial shoulder of the fitting to form projections or a grip on which an axial removal force may be directed. In the preferred embodiment, the thread protector is arranged as a square-like tube having four equally spaced corners so that some corner area is always exposed radially outward of a hexagonal shoulder regardless of the angular position of the sleeve relative to the fitting body.

DESCRIPTION OF THE PREFERRED EMBODIMENT

Figure 1:
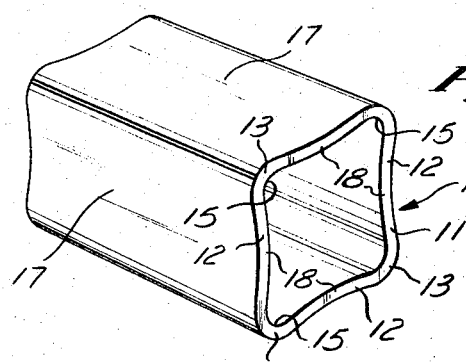
FIG. 1 is a perspective view of a thread protector constructed in accordance with the invention.

Referring now to FIG. 1, there is shown a thread protecting sleeve 10 in a normal or unstressed condition. The sleeve 10 is a tubular member having a polygonal, somewhat square, cross-sectional shape. The cross section of the sleeve is substantially uniform along the length of the sleeve and is seen at an end face 11 of the sleeve 10. As shown, preferably, the cross section includes four sides 12 of substantially equal length and angular separation and four corners 13 joining adjacent sides 12. The cross-sectional sides 12 when extended longitudinally, define sidewalls 17 of substantially uniform thickness.

Preferably, each cross-sectional side or end 12 is reentrant or concave with respect to the center of the sleeve 10. That is, a side 12 reenters or passes through an imaginary line drawn through the inside 15 of its associated corners 13 so that a midpoint 18 of each side 12 lies radially inward of such a line. Desirably, the thread protecting sleeve or article 10 is constructed of a non-metallic resilient plastic material such as polyethylene, polypropylene or the like.

Figure 2:
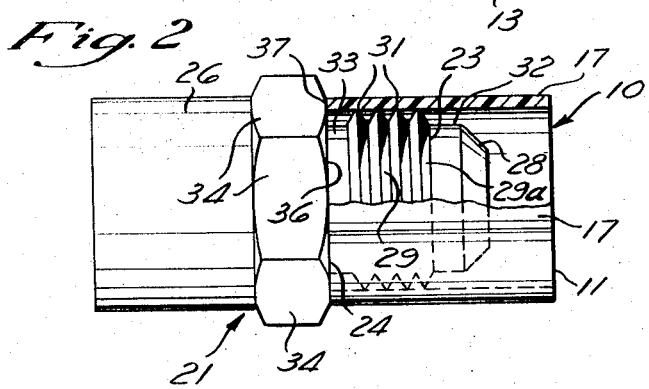
FIG. 2 is an elevational view of the thread protector of FIG. 1, partially in cross section, in assembled position on a fitting body.
Figure 3:
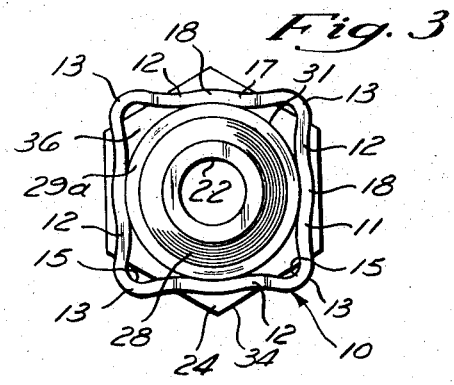
FIG. 3 is an end view of the thread protector and fitting assembly shown in FIG. 2.

FIGS. 2 and 3 illustrate the sleeve 10 installed on a typical hydraulic fitting body 21. The illustrated fitting body 21 is generally cylindrical in shape and includes a central throughbore 22, a threaded end 23, an intermediate radial shoulder 24, and an opposite end 26 adapted with means (not shown) for connection with a source or sink of fluid. The fitting 21 is provided with a conical sealing surface 28 at the extremity of its threaded end 23. The threaded end 23 has formed thereon an axial length of helically cut mechanical threads 29 of uniform diameter. The outer peripheries, designated 31, of the threads 29 define the thread crest diameter. The threads 29 are axially bound between two cylindrical portions 32 and 33 having diameters substantially equal to the root diameter of the threads 29. The radial shoulder 24 extends radially outward, from the inner cylindrical portion 33 of the threaded end 23, substantially beyond the outer peripheries 31 of the threads 29. The outer surfaces, designated 34, of the radial shoulder 24 are planar surfaces which provide wrench flats and which define a hexagonal cross section or profile. The radial shoulder 24 includes a radial face 36 facing the threaded end 23 of the fitting 10.

The sleeve 10 is proportioned so that its interior surfaces corresponding to the midportions 18 of its cross-sectional sides 12 define an inscribed circle smaller than the crest diameter of the threads 29 when the sleeve is in a natural or unstressed condition. As seen most clearly in FIG. 3, the sidewalls 17 of the sleeve 10 must be displaced radially outward from the center of the sleeve to allow it to be positioned on the threaded end 23 of the fitting 21. In conjunction with the type of fitting 21 illustrated in FIGS. 2 and 3, the sleeve 10 may be installed on the fitting 21 by axially forcing its lead or forward radial face 37 against the conical sealing surface 28 and the first thread, designated 29a. The tapered shape of the lead face of the first thread 29a provides a camming action to drive the midportions 18 of the lead face 37 radially outward and over the peripheries 31 of the threads 29. The sleeve 10 is forced axially forward until its lead radial face 37 abuts the radial face 36 of the shoulder 24. Preferably, the sleeve 10 is somewhat longer than the axial length of the threaded end 23 of the fitting 21 to adequately protect the end of the fitting.

As shown in FIG. 3, the sidewalls 17 of the sleeve 10 are forced radially outwardly to fit over the peripheries 31 of the threads 29. Ideally, the sleeve 10 is constructed of a material that is sufficiently resilient and is proportioned so that the deflection of the sidewalls 17 remains elastic. This insures that internal stresses in the sleeve 10 will provide sufficient gripping forces between the interior surfaces of the sleeve and the threads 29.

A study of FIG. 3 shows that the sleeve 10 is expanded to fit a particular size, generally, by bending the sidewalls 17. Expansion of the sleeve 10 through bending of its sidewalls 17 permits the sleeve to accommodate large variations in thread diameters without excessively tight fits which would otherwise normally occur if the sleeve was expanded only under hoop stresses. It may be understood that as a sidewall 17 is deflected radially outward at the midportion 18, its effective length between associated corners 13 is increased. This results in moving the corners 13 radially outward and, in turn, expands the sleeve 10 with a relatively low spring rate characteristic that avoids excessively tight fits which would hinder installation and removal of the sleeve 10.

The polygonal cross-sectional configuration of the sleeve 10 facilitates removal of the sleeve from the fitting 21 by projecting at its corners 13 radially beyond the wrench flats 34 of the radial shoulder 24. The corners 13 at the inner or lead face 37 of the sleeve 10 may be engaged to provide a finger grip or a point against which an axial force away from the shoulder 24 may be directed to remove the sleeve 10.

Figure 4:
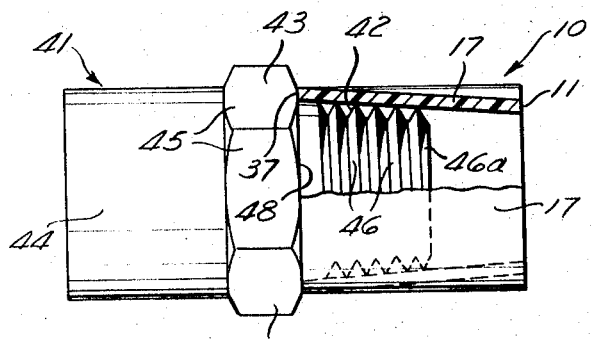
FIG. 4 is an elevational view of the thread protector, partially in cross-section, in assembled position on a fitting body having tapered pipe threads.
Figure 5:
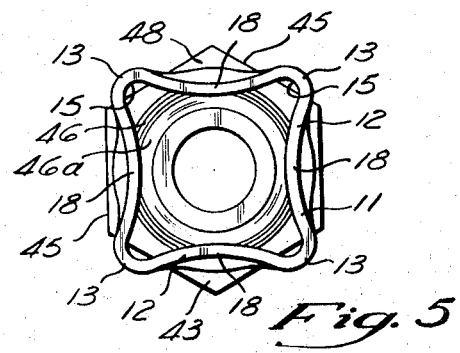
FIG. 5 is an end view of the thread protector and fitting assembly shown in FIG. 4.

FIGS. 4 and 5 illustrate the adaptability of the sleeve 10 to accommodate variations in thread diameters and styles. Here, a fitting 41 is illustrated having a tapered threaded end 42, a radial shoulder 43, and an opposite end 44. The fitting 41 has generally the same configuration as the fitting 21 described above with the exception of the threaded end. The periphery of the shoulder 43 is provided with planar surfaces or wrench flats 45 which define a hexagonal cross section or profile. The threads, designated 46, are pipe threads which increase in crest diameter as they wind helically towards the radial shoulder 43. The first thread, designated 46a, has a crest diameter somewhat smaller than the last thread adjacent the radial shoulder 43. The mean or average thread diameter is represented by a thread midway between these first and last threads.

The sleeve 10 is installed on the fitting 41 by catching the lead end of one sidewall 17 on the first or outer thread, designated 46a, and then by manipulating the sleeve 10 until the opposite and adjacent sidewalls 17 extend over the first thread 46a and then by pushing the sleeve 10 axially over the remaining threads 46 until the lead face 37 of the sleeve 10 abuts a radial face 48 of the shoulder 43 of the fitting. The sleeve 10 conforms to the taper angle of the pipe threads 46 by expanding in an axially varying manner. The inward or lead end 37 expands to a maximum while the outer end 11 expands a minimal amount or not at all depending on the relative dimensions of the sleeve 10 and fitting 41. It is important that the inscribed circle defined by the mid-points 18 of the sleeve in a free state is smaller than the crest diameters of at least some of the larger threads of the fitting 41. By conforming to the taper of the threads 46, a positive fit of the sleeve 10 on the threaded end 42 of the fitting 41 is assured. The sleeve 10, may of course, be removed from the fitting 41 in the same manner as that described in relation to the first mentioned fitting 21.

The thread protector or sleeve 10 is effective to prevent damage to the threads 29 or 46 of the fittings 21 or 41 by absorbing the forces of impacts or blows accidentally directed to the threaded ends 23 or 42 of the fittings during handling or shipment of the fitting before ultimate use. Since the sleeve 10 is normally disposable, it is important that the sleeve be economical to manufacture. As illustrated in FIGS. 1 through 5, the sleeve 10 may be formed as a cut-off of a continuously extruded tube.

Figure 6:
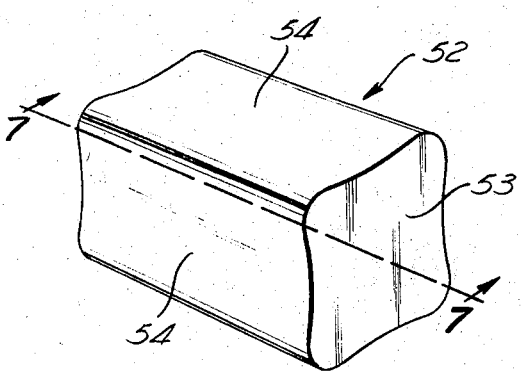
FIG. 6 is a perspective view of a second embodiment of the thread protector in accordance with the invention.
Figure 7:
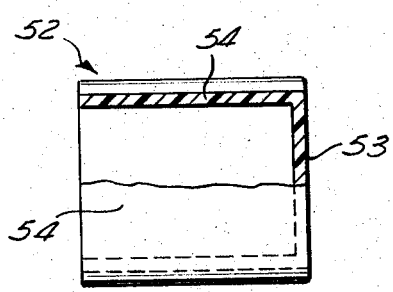
FIG. 7 is a side view of the thread protector, partially in cross section, as viewed in the direction indicated by the lines 7—7 in FIG. 6.

FIGS. 6 and 7 illustrate a second preferred embodiment of a sleeve 52 constructed in accordance with the invention. In this embodiment, the sleeve 52 is provided with an end wall 53 generally perpendicular to the axis of the sleeve 52 and integral with the longitudinal sidewalls, designated 54. The sidewalls 54 are defined by a cross section substantially identical to the free or normal cross section of the above described sleeve 10 illustrated in FIG. 1. This closed type of sleeve 52 may be employed in situations where it is important to prevent entrance of foreign material axially into the sleeve or where axially directed blows are highly probable. The sleeve 52 functions in substantially the same manner as that described above relative to the open ended sleeve 10 and may be installed and removed in a substantially identical manner to that of the latter sleeve 10.

While the sleeve shown in the several embodiments of the invention has been described and shown as having a substantially uniform wall thickness, it is recognized that under certain circumstances it may be considered desirable to increase or decrease the wall thickness at certain places such as either the corners or the mid-points of the sides if greater or lesser flexibility is desired at these points. If the wall thickness is reduced at the corners below that at the mid-portions, the general flexibility of the sleeve is increased without changing to a softer material, while retaining the same protective thickness over the threads. On the other hand, if the wall thickness is decreased in the midportions, a savings in material may be achieved without any substantial change in the rigidity of the sleeve.

Although preferred embodiments of this invention are illustrated, it is to be understood that various modifications and rearrangements may be resorted to without departing from the scope of the invention disclosed herein.

What is claimed is:

1. In combination, a fitting member and a thread protector; said fitting member having an end portion, said end portion having external threads and each of said threads defining a crest diameter; said thread protector being a generally tubular, polygonal member of resilient material and being positioned axially over the exterior of the threaded end portion of said member to protect the threads thereof from damage, said thread protector having a polygonal cross section substantially uniform along its length, said polygonal cross section having less than six sides and less than six corners defining interior surfaces of the thread protector, each of said sides being normally concave inwardly toward the interior of the thread protector, each of said corners being convex outwardly away from the interior of the thread protector, the radius of curvature of said sides being substantially greater than the radius of curvature of said corners, said sides normally defining an inscribed circle smaller in diameter than the crest diameter of at least some of said threads, said concave sides each being resiliently deformed radially outward from the interior of said thread protector and the length of each of said sides between their associated corners each being increased to increase the diameter of said inscribed circle and to permit the thread protector to be positioned on the end portion of the threaded fitting member, and said concave sides of said thread protector resiliently engaging the crest of at least some of the threads of said fitting member to retain said thread protector on said fitting member.

2. The combination defined in claim 1, wherein said fitting member includes a predetermined number of wrench flats axially adjacent said threaded end portion, said wrench flats being disposed radially outward of said threads, said polygonal thread protector includes axially facing finger grip means for receiving an axially applied force to axially remove said thread protector from said threaded end portion, and said axially facing finger grip means includes at least one of said corners disposed radially outward of at least one of said flats.

3. The combination defined in claim 2, wherein the number of said corners of said polygonal thread protector is less than said predetermined number of wrench flats whereby said corners of said polygonal thread protector cannot be aligned with the junctions of said wrench flats.

4. The combination defined in claim 3, wherein said predetermined number of wrench flats is six and said number of corners is four.

5. In combination, a fitting member and a thread protector; said fitting member having an end portion, said end portion having external threads, and each of said threads defining a crest diameter; said thread protector being a generally tubular, polygonal member of resilient material and being positioned axially over the exterior of the threaded end portion of said member to protect the threads thereof from damage, said thread protector having a polygonal cross section substantially uniform along its length, said polygonal cross section having four sides and four corners defining interior surfaces of the thread protector, at least some of said sides being normally concave inwardly toward the interior of the thread protector, each of said corners being convex outwardly away from the interior of the thread protector, the radius of curvature of said sides being substantially greater than the radius of curvature of said concave corners, said sides normally defining an inscribed circle smaller in diameter than the crest diameter of at least some of said threads, said concave sides being resiliently deformed radially outward from the interior of said thread protector to a configuration convex outwardly away from the interior of said thread protector and the length of said concave sides between their associated corners being increased to increase the diameter of said inscribed circle and to permit the thread protector to be positioned on the end portion of the threaded fitting member, and said concave sides of said thread protector resiliently engaging the crest of at least some of the threads of said fitting member to retain said thread protector on said fitting member.

6. The combination defined in claim 5, wherein said external threads are threads which increase in crest diameter as they wind helically from the end of said fitting member, and said resilient deformation of said sides of said thread protector being greater adjacent the threads of larger crest diameter and being lesser adjacent the threads of smaller crest diameter whereby said thread protector conforms to the taper of said threads by expanding in an axially varying manner.

* * * * *